United States Patent
Kuramoto et al.

(10) Patent No.: US 9,180,850 B2
(45) Date of Patent: Nov. 10, 2015

(54) WORKING VEHICLE

(75) Inventors: Takashi Kuramoto, Sakai (JP);
Masashi Osuga, Sakai (JP); Masaki Hayashi, Sakai (JP); Shinichiro Saji, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 177 days.

(21) Appl. No.: 13/418,860

(22) Filed: Mar. 13, 2012

(65) Prior Publication Data

US 2013/0048445 A1     Feb. 28, 2013

(30) Foreign Application Priority Data

Aug. 23, 2011    (JP) ................................ 2011-181778

(51) Int. Cl.
*B60T 11/06*      (2006.01)

(52) U.S. Cl.
CPC ...................................... *B60T 11/06* (2013.01)

(58) Field of Classification Search
CPC ... B60T 11/06; B60T 11/101; F16H 57/0483; F16H 48/08; F16H 2048/423; F16H 2048/426; F16C 2361/61
USPC .... 188/204 R, 106 R, 106 F, 106 P, 2 D, 4 B, 188/18 A, 72.8; 60/581; 192/54.52, 70.23, 192/93 R, 93 A, 218, 219.4, 70.24
See application file for complete search history.

(56) References Cited

U.S. PATENT DOCUMENTS

| | | | | | |
|---|---|---|---|---|---|
| 1,795,299 | A | * | 3/1931 | Eddy | 188/152 |
| 2,033,428 | A | * | 3/1936 | Hagan | 188/204 R |
| 2,113,435 | A | * | 4/1938 | Sparrowhawk | 188/204 R |
| 2,126,984 | A | * | 8/1938 | Bock | 188/106 P |
| 2,155,030 | A | * | 4/1939 | Wilkins | 188/106 P |
| 2,664,973 | A | * | 1/1954 | Colley | 188/106 R |
| 2,792,083 | A | * | 5/1957 | Bourque et al. | 188/106 R |
| 3,220,189 | A | * | 11/1965 | Caramanna | 60/581 |
| 3,838,756 | A | * | 10/1974 | Pottorff | 188/170 |
| 5,251,968 | A | * | 10/1993 | Rath | 303/9.62 |

FOREIGN PATENT DOCUMENTS

| | | | | | |
|---|---|---|---|---|---|
| JP | 61143250 | A | * | 6/1986 | B60T 1/06 |
| JP | 03024352 | A | * | 2/1991 | F16H 57/04 |
| JP | 2004-50952 | | | 2/2004 | |

* cited by examiner

*Primary Examiner* — Bradley King
*Assistant Examiner* — Stephen Bowes
(74) *Attorney, Agent, or Firm* — Greenblum & Bernstein, P.L.C.

(57) ABSTRACT

An operating system is formed in which an engagement shaft supported on an end portion of a brake piston is inserted through an engagement hole portion of a balance member; an operation wire is connected to the balance member via a coupling pin; and brake operating arms of rear wheel brake mechanisms are operated by a pair of arm portions of the balance member. A broad area is formed in the engagement hole portion in a manner allowing the balance member to swing about the coupling pin when the operation wire is pulled.

20 Claims, 13 Drawing Sheets

WORKING VEHICLE

CROSS-REFERENCE TO RELATED APPLICATIONS

The present application claims priority under 35 U.S.C. §119 of Japanese Application No. 2011-181778, filed on Aug. 23, 2011, the disclosure of which is expressly incorporated by reference herein in its entirety.

BACKGROUND OF THE INVENTION

1. Field of the Invention

The present invention relates to a working vehicle in which a brake operating system transmits a brake operating force of a brake operating device from an equalizer to brake mechanisms of left and right wheels; and the equalizer has a pair of arm portions transmitting the brake operating force to the left and right brake mechanisms, and is provided with a swingable balance member for absorbing a difference in operating strokes of the left and right brake mechanisms.

2. Description of Related Art

As a working vehicle configured as described above, Related Art 1 discloses a working vehicle in which a hydraulic brake system is provided transmitting oil pressure from a master cylinder to front wheel brakes and rear wheel brakes via piping to perform a brake operation when a brake pedal is depressed; and a mechanical brake system is provided transmitting a pulling operating force of an operation wire from a stabilizer link (an equalizer of the present invention) to the left and right rear wheel brakes to perform a brake operation when a parking lever (a brake operating device of the present invention) is operated.

In Related Art 1, the stabilizer link (the equalizer of the present invention) is configured with a balance member; a wire linked to the parking lever (the brake operating device of the present invention) is connected to a center position of the balance member; and wires connected to two end positions of the balance member are connected to operation levers of the left and right rear wheel brakes (brake mechanisms of the present invention). From such a configuration, when the parking lever is operated, by the swing of the balance member, a difference in operating strokes of the left and right rear wheel brakes is absorbed and uniform brake operations are realized.

[Related Art 1] Japanese Patent Laid-Open Publication No. 2004-50952

In a working vehicle, a hydraulic brake system obtaining a braking force by operating a brake pedal and a mechanical brake system obtaining a braking force by operating a parking brake operating tool are required. An equalizer for uniformly transmitting the operating force of the parking brake operating tool to the brake mechanisms of the left and right rear wheels is also required.

However, as described in Related Art 1, in the case where left and right hydraulic cylinders are provided for operating the left and right rear wheel brakes, the hydraulic cylinders and a mechanical configuration performing brake operations using the driving forces of the hydraulic cylinders are required. In addition, configurations such as wires and the like transmitting the operating force of the parking brake operating tool are required. Therefore, the number of parts increases, and configuration complexity also increases. In this regard, there is room for improvement.

SUMMARY OF THE INVENTION

A purpose of the present invention is to configure a brake operating system with fewer parts, smoothly operating left and right brake mechanisms whether an operating force is a hydraulic actuation force or a mechanical actuation force.

One aspect of the present invention is a working vehicle, in which a brake operating system transmits a brake operating force of a brake operating device from an equalizer to brake mechanisms of left and right wheels. The equalizer has a pair of arm portions transmitting the brake operating force to the left and right brake mechanisms, and is provided with a swingable balance member for absorbing a difference in operating strokes of the left and right brake mechanisms. The brake operating device includes a single brake piston that is actuated in a projecting direction by pressure of brake oil supplied by a depression operation of a brake pedal; and a brake operating member transmitting an operating force of a parking brake operating tool. The brake operating member is connected to the balance member. A traction device is provided transmitting an actuation force of the brake piston in the projecting direction to the balance member. The traction device is provided with an accommodation portion allowing relative movement between the brake piston and the balance member during action of an operating force of the brake operating member.

According to this configuration, even in the case where there is a difference in the operating strokes until the left and right brake mechanisms reach a braking state, when the brake piston is projected by the depression operation of the brake pedal, due to the swing of the balance member, uniform operation of the left and right brake mechanisms is realized. Further, in the case where there is a difference between the operating strokes until the left and right brake mechanisms reach a braking state, when the operating force is transmitted from the brake operating member to the balance member when the parking brake operating tool is operated due to the swing of the balance member, the difference between the operating strokes of the left and right brake mechanisms is absorbed to realize uniform brake operations. In particular, the brake piston performs linear actuation. When the balance member is actuated by the operation of the parking brake operating tool, due to a difference between the operating strokes of the operating systems of the left and right brake mechanisms, it is possible that a force is applied displacing the balance member in a direction perpendicular to the actuation direction of the brake piston. In this case, the accommodation portion allows displacement of the balance member in a direction perpendicular to the actuation direction of the brake piston, and thus a smooth brake operation is realized. Therefore, a brake operating system can be configured with fewer parts, smoothly operating the left and right brake mechanisms whether an operating force is a hydraulic actuation force or a mechanical actuation force.

In the present invention, the traction device includes an engagement shaft in an orientation perpendicular to an axis of the brake piston; and an engagement hole portion through which the engagement shaft is inserted. The actuation force of the brake piston in the projecting direction is transmitted to the balance member via contact between the engagement shaft and an inner periphery of the engagement hole portion. The accommodation portion is configured with a broad area formed in the engagement hole portion in a manner allowing relative movement between the engagement shaft and the engagement hole portion in a direction perpendicular to the actuation direction of the brake piston.

According to this configuration, when the brake piston is actuated in the projecting direction, the balance member is actuated by the contact from the engagement shaft to the inner periphery of the engagement hole portion of the balance member. Further, the engagement shaft is configured to be inserted through the engagement hole portion. Therefore, the balance member is allowed to swing, and displacement of the balance member is allowed in a direction perpendicular to the actuation direction of the brake piston, via the broad area of the engagement hole portion.

In the present invention, the engagement shaft is formed at a front end portion of the brake piston. The engagement hole portion is formed on the balance member. As viewed in a direction along the axis of the engagement shaft, the engagement hole portion is formed in a triangular shape, in which width increases toward an upstream side of the projecting actuation of the brake piston. The broad area is formed by a portion of the engagement hole portion with a wide width.

According to this configuration, the engagement hole is configured in a simple shape of a triangle, and thereby, the swing of the balance member and the displacement of the balance member in a direction perpendicular to the actuation direction of the brake piston are allowed. Since no complex components are involved, a simple configuration is possible.

In the present invention, the left and right brake mechanisms are built-in to a transmission case transmitting a driving force to left and right wheels. Brake operating shafts operating the left and right brake mechanisms are provided in parallel orientations protruding on a predetermined outer wall of the transmission case. The balance member is arranged outside of the outer wall in an orientation parallel to the outer wall.

According to this configuration, the balance member is arranged outside the predetermined outer wall of the transmission case. Operation arms provided on the parallel brake operating shafts and the balance member are linked via rods, wires, and the like. Thereby, the left and right brake mechanisms built-in to the transmission case can be simultaneously operated from the predetermined outer wall side of the transmission case.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

In the following, an embodiment of the present invention is explained based on the drawings.

(Overall Configuration)

Figure 1:
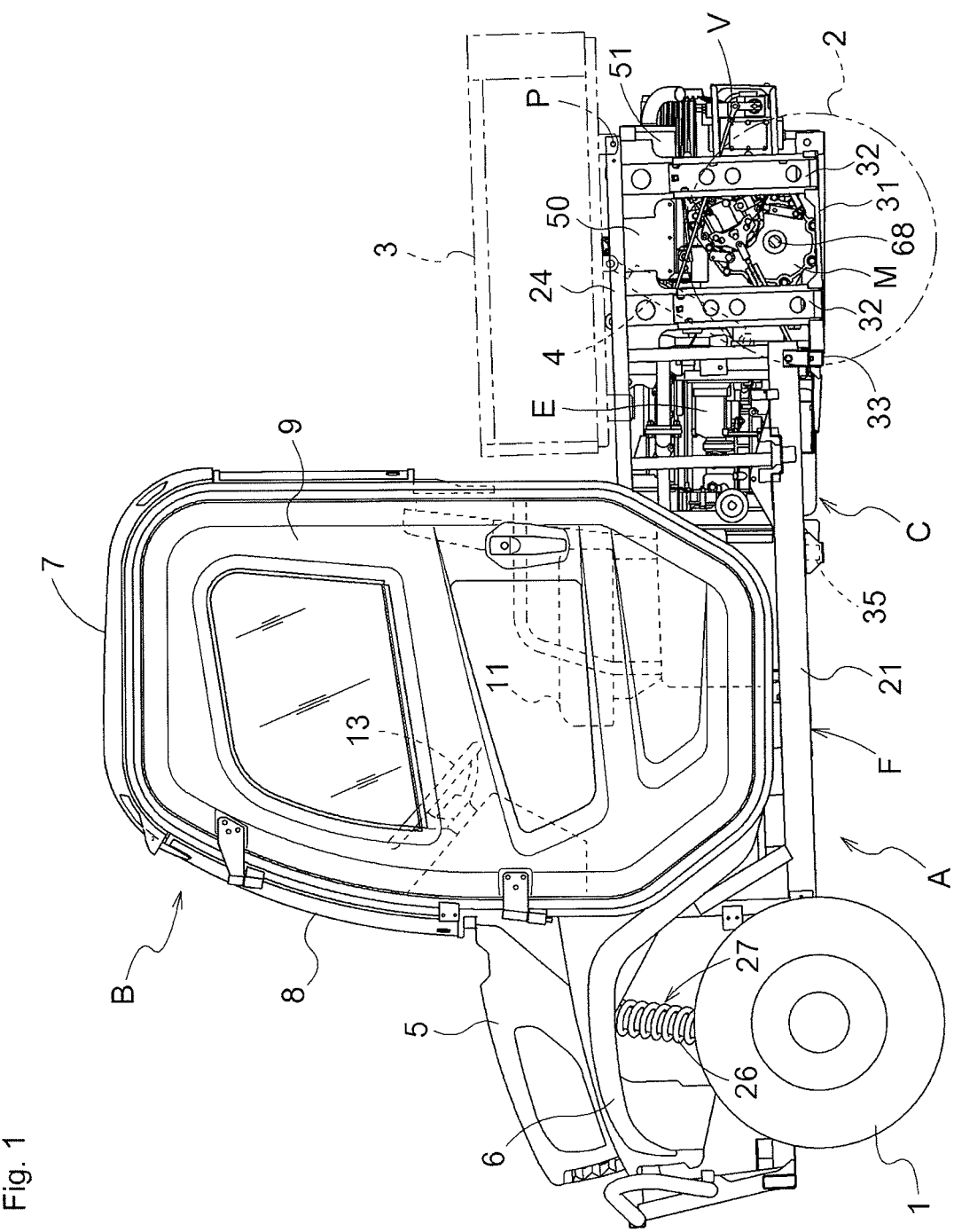
FIG. 1 is an entire side view of a working vehicle.
Figure 2:
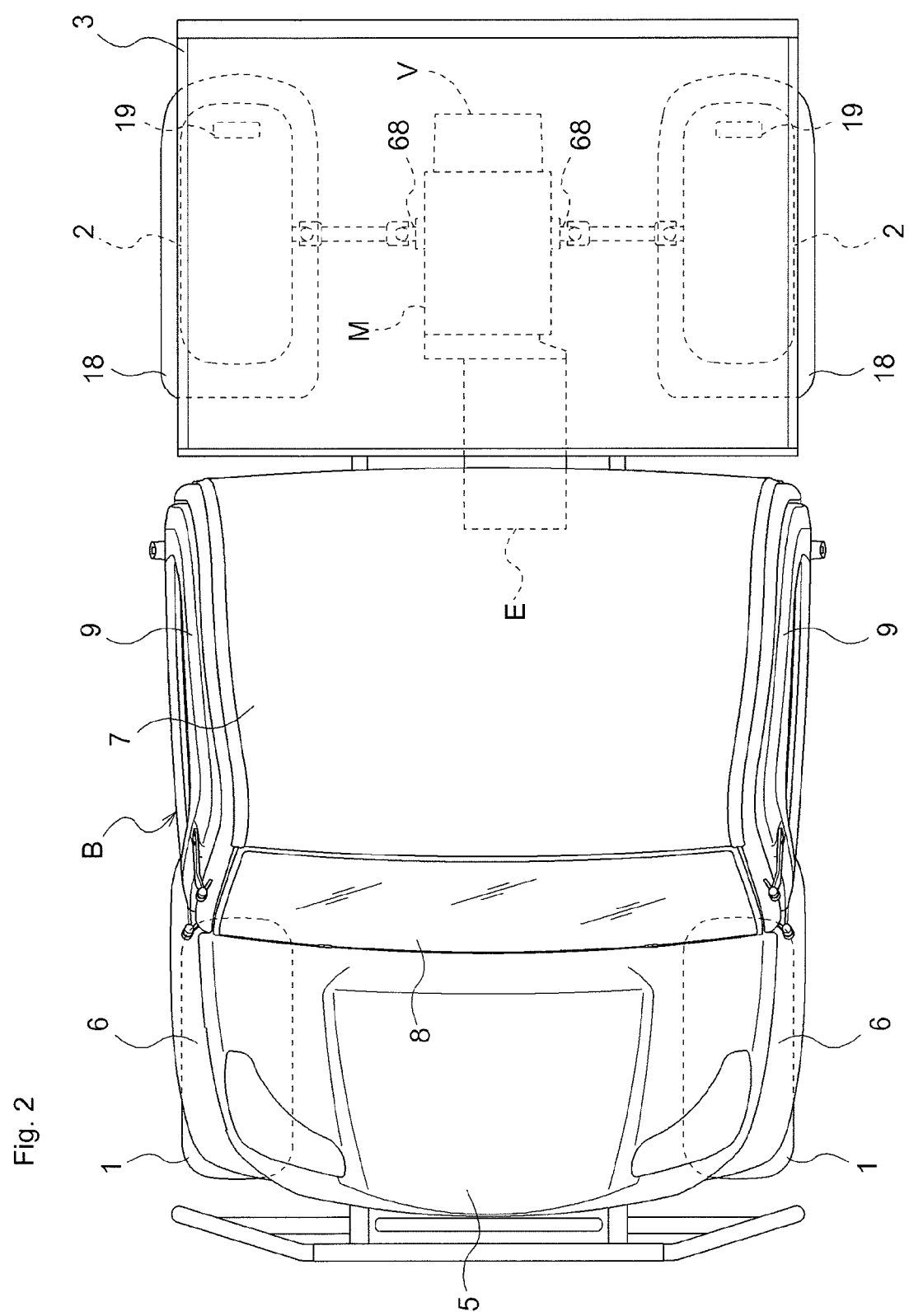
FIG. 2 is an entire plan view of the working vehicle.
Figure 3:
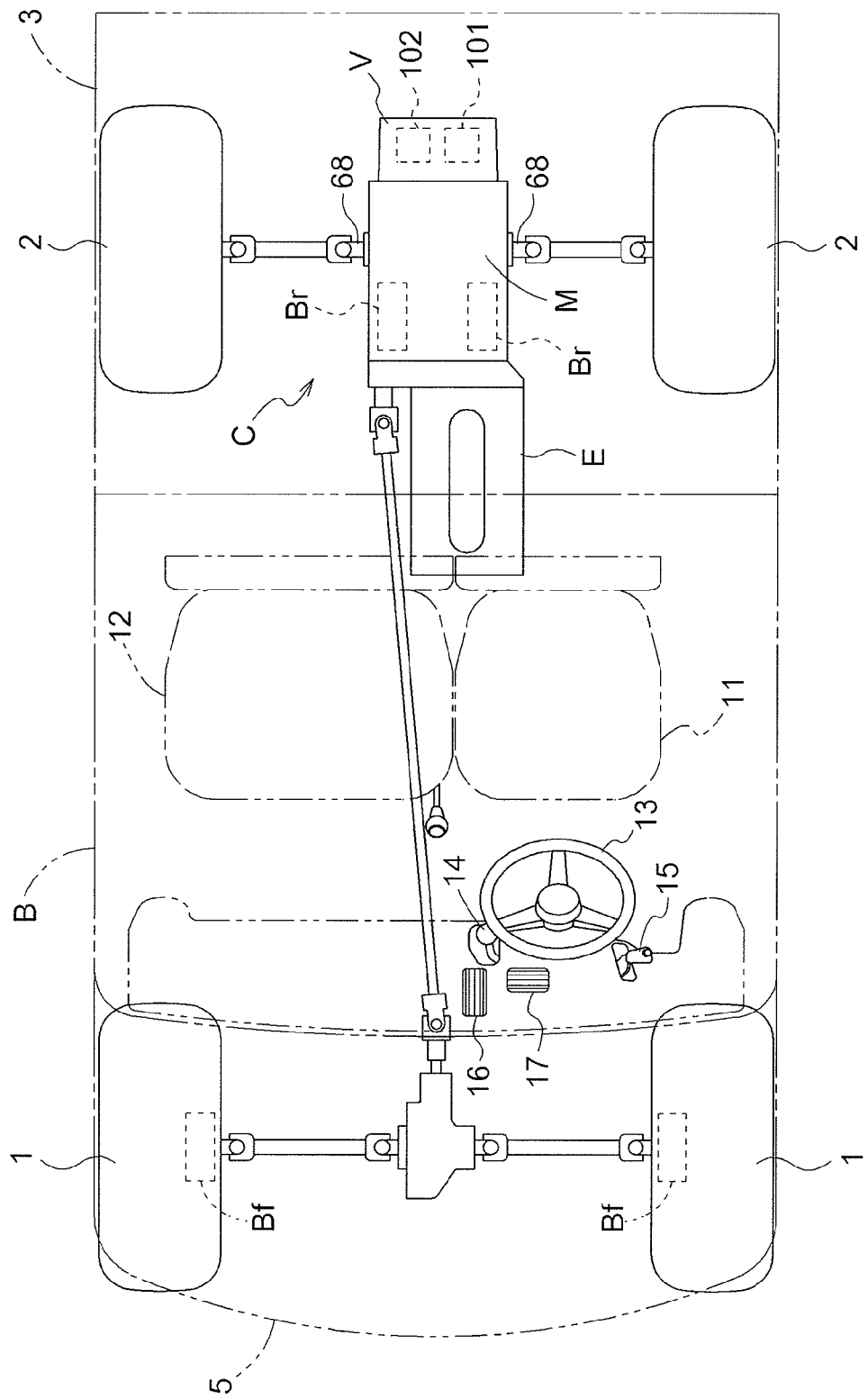
FIG. 3 is a plan view illustrating a transmission system of the working vehicle.

As FIGS. 1-3 illustrate, a working vehicle is configured in which a traveling vehicle body A is provided with a pair of freely steerable left and right front wheels 1 and a pair of left and right rear wheels 2; a cabin B constituting an operating unit is provided at a front position of the traveling vehicle body A; a cargo bed 3 is provided at a rear portion of the traveling vehicle body A; and a drive unit C is provided at a position below the cargo bed 3.

This working vehicle is configured to be of a four-wheel drive type that has a travel drive system transmitting a driving force from the drive unit C to the front wheels 1 and the rear wheels 2, and is used for multipurpose work such as agricultural work and transportation work. The cargo bed 3 is configured in a manner that a rear end side of the cargo bed 3 is supported in a manner swingable about an axis P, which is in a lateral orientation with respect to a rear end position of the traveling vehicle body A, and a front end side of the cargo bed 3 can be raised via operation of a dump cylinder 4 to unload a load backward.

A hood 5 operable to open and close is provided at a front position of the traveling vehicle body A, and front fenders 6 covering above the front wheels 1 are arranged at the lower left and right of the hood 5. The cabin B is provided with a windshield 8 at a front portion of a cabin body 7 and doors 9 operable to open and close with respect to lateral sides of the cabin body 7.

Inside the cabin B, a driver seat 11 on which a driver sits and a laterally-long two-seater assistant seat 12 adjacent to the driver seat 11 are provided. At front positions of the driver seat 11, a steering wheel 13 steering-controlling the front wheels 1, a main speed change lever 14 setting a traveling speed, and a parking lever 15 as a parking brake operating tool are provided. At lower positions, an accelerator pedal 16 as a speed change operation tool controlling a traveling speed, and a brake pedal 17 are provided.

Rear fenders 18 covering above the left and right rear wheels 2 are provided at a rear end side of the traveling vehicle body A. Brake lights 19 are provided on the rear fenders 18.

(Vehicle Body Frame)

Figure 4:
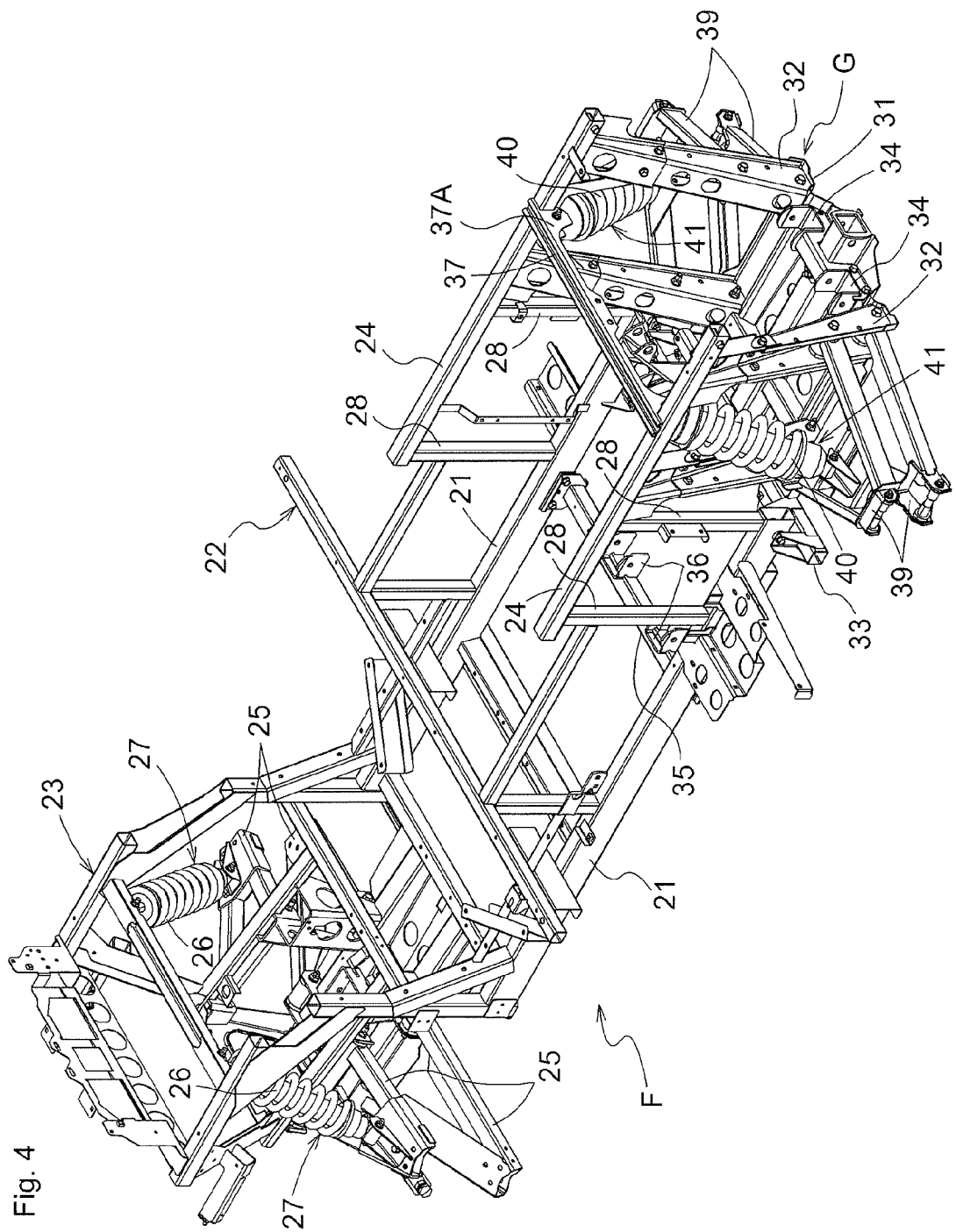
FIG. 4 is a perspective view of a vehicle body frame.

A vehicle body frame F is provided as a strength member of the traveling vehicle body A. As FIG. 4 illustrates, the vehicle body frame F is configured to include a pair of left and right main frames 21 extending in a longitudinal direction; a cabin frame unit 22 supporting the cabin B at a front position of the main frames 21; a front frame unit 23 connecting front ends of the main frames 21; upper frames 24 located at positions above a rear position of the main frames 21 and extending in the longitudinal direction of the traveling vehicle body A in a manner parallel to the main frames 21; and a detachable frame unit G supporting the drive unit C.

Further, square-shaped steel pipes are used for the main frames 21 and the upper frames 24, and steel products formed from squared pipes, channels, and the like are used for the cabin frame unit 22 and the front frame unit 23.

The cabin frame unit 22 is configured as a structure that includes a frame body in a lateral orientation arranged at a front portion of the cabin B and a frame body in a lateral orientation arranged at a lower side of the driver seat 11. The front frame unit 23 is a structure arranged at a lower side of the hood 5, and, at each of a left and right position of the front frame unit 23, base end portions of a pair of upper and lower front suspension arms 25 configured as a double wishbone type are supported in a manner swingable about longitudinally oriented swing axes. Further, lower ends of front suspension units 27 are supported by the front suspension arms 25, the front suspension units 27 having front suspension springs 26 that are compressed when the front suspension arms 25 swing upward. Upper ends of the front suspension units 27 are supported by the front frame unit 23.

The left and right main frames 21 and the upper frames 24 that are arranged above the main frames 21 are connected by vertically oriented connecting frames 28 that are formed using square-shaped steel pipes. Further, at a position adjacent to a rear end side of the main frames 21 and at a lower side of the upper frames 24, the detachable frame unit G is arranged in a manner separably connected to the main frames 21 and the upper frames 24. Two end portions of a support frame 35 are detachably connected to rear positions of the left and right main frames 21. A lateral frame 37 is provided on an upper surface side of the left and right upper frames 24 in a form bridging the left and right upper frames 24.

The detachable frame unit G is configured to include a mount frame 31 arranged at a lower side of the drive unit C (lower than the upper frames 24); two vertical frames 32 arranged on each of a left and right side of the mount frames 31 connecting the mount frame 31 to the left and right upper frames 24; and a front frame 33 in a lateral orientation formed at a front end side of the mount frame 31.

With respect to the left and right vertical frames 32, base end portions of a pair of upper and lower rear suspension arms 39 configured as a double wishbone type are supported in a manner swingable about longitudinally oriented swing axes. Further, lower ends of rear suspension units 41 are supported by the rear suspension arms 39, the rear suspension units 41 having rear suspension springs 40 that are compressed when the rear suspension arms 39 swing upward. Upper ends of the rear suspension units 41 are supported by suspension support portions 37A of the lateral frame 37.

Although a configuration of separation of the detachable frame unit G is not described in detail, the detachable frame unit G is configured in a manner detachable from the vehicle body frame F, by separating the detachable frame unit G from other frames, in a state in which the drive unit C and the rear wheels 2 are supported by the detachable frame unit G.

The mount frame 31 is formed by working, such as press working, a steel plate and has rib-like portions formed thereon to increase strength. The mount frame 31 has a lateral width set to be shorter than a lateral distance between the left and right upper frames 24. In order to linearly connect two end portions of the mount frame 31 and the upper frames 24 via the vertical frames 32, the left and right vertical frames 32 are provided in an inclined manner such that an upper end side is increasingly displaced toward the outside of the vehicle body.

Figure 5:
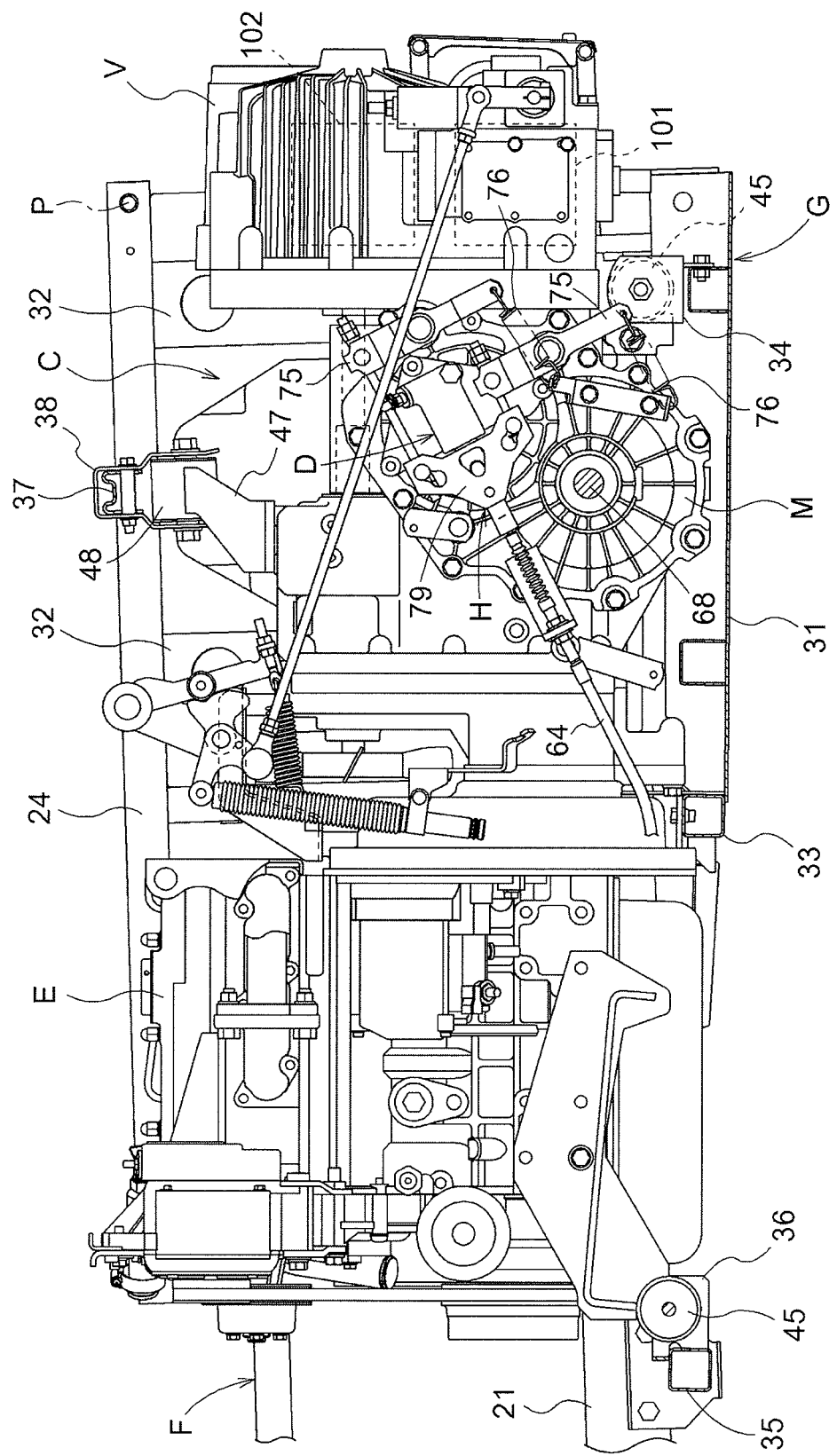
FIG. 5 is a side view of a drive unit.

The drive unit C is configured with the engine E, the transmission case M, and the continuously variable transmission V integrated by connecting in this order the engine E, the transmission case M, and the continuously variable transmission V. As FIGS. 4 and 5 illustrate, two lower left and right sites of a front end position of the engine E are supported on a pair of left and right front mount supports 36 of the support frame 35 by lower anti-vibration mounts 45. Two lower left and right sites of a rear end position of the transmission case M are supported on a pair of left and right rear mount supports 34 of the mount frame 31 by lower anti-vibration mounts 45. Further, at a middle position of the lateral frame 37, an upper mount support 38 is provided. An upper end of a hanging frame 47 that protrudes on an upper surface of the transmission case M is supported in the upper mount support 38 by an upper anti-vibration mount 48. This allows the drive unit C to be supported on the vehicle body frame F.

A muffler 51 having a cover 50 thereabove for protection against heat is provided at a left side of a rear upper position of the transmission case M. Exhaust gas of the engine E is supplied to the muffler 51 to reduce exhaust sound of the engine E.

(Transmission Case and Brake Mechanisms)

Figure 6:
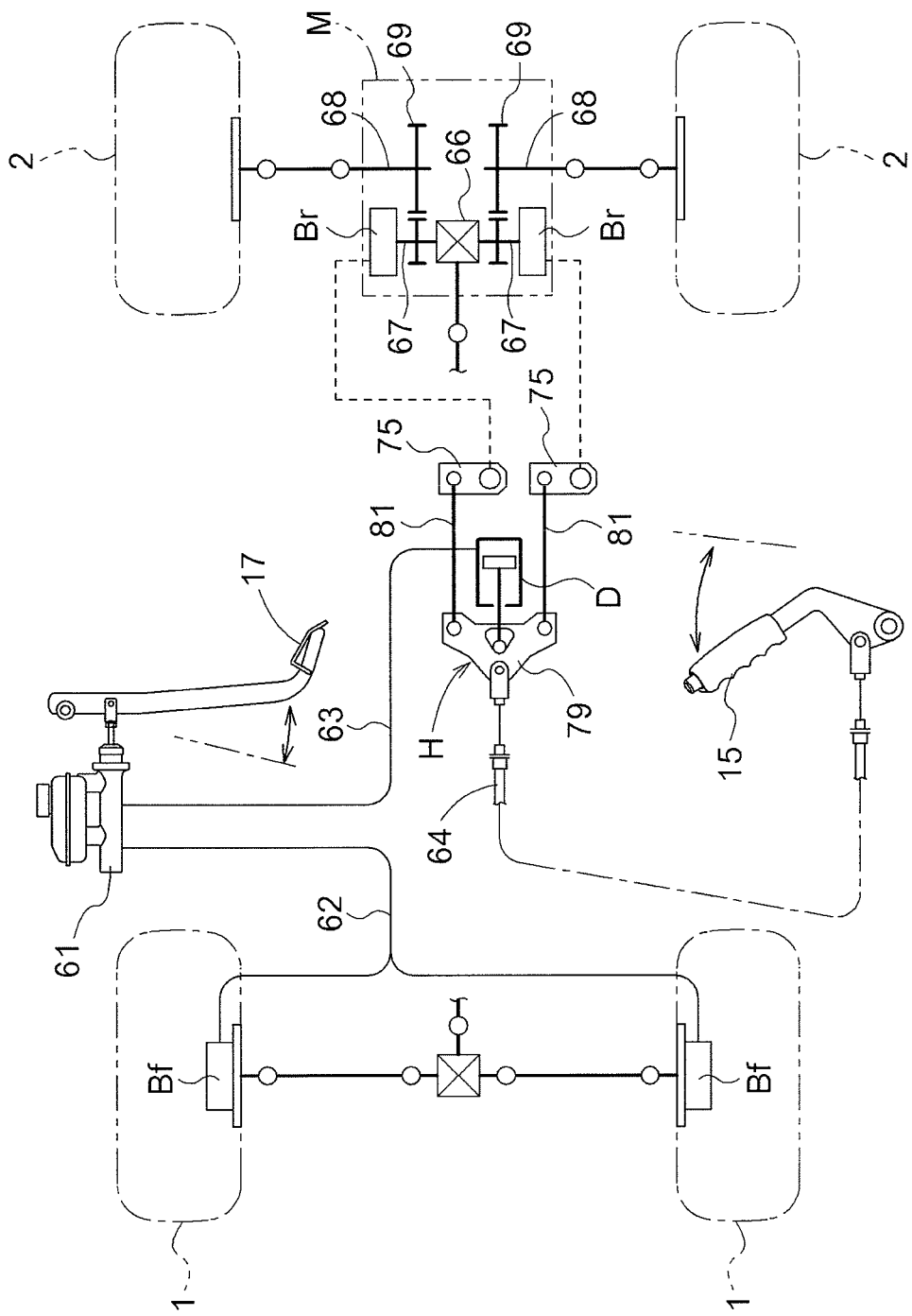
FIG. 6 schematically illustrates a brake operating system.

As FIG. 6 illustrates, in this working vehicle, a hydraulic brake operating system is provided brake-operating front wheel brake mechanisms Bf of the left and right front wheels 1 and rear wheel brake mechanisms Br of the left and right rear wheels 2 via the pressure of brake oil when the brake pedal 17 is depressed. In addition, a mechanical brake operating system is provided brake-operating the rear wheel brake mechanisms Br of the left and right rear wheels 2 via an operating force of the parking lever 15 as a brake operating member.

As a specific configuration, the hydraulic brake operating system is configured in a manner that an oil passage system is provided supplying the brake oil pressurized by a master cylinder 61 when the brake pedal 17 is depressed to the front wheel brake mechanisms Bf of the left and right front wheels 1 via a front brake oil passage 62, and at the same time, supplying the brake oil pressurized by the master cylinder 61 to a cylinder unit D via a rear brake oil passage 63; and in a manner that an actuating force of the cylinder unit D is transmitted from an equalizer H to the rear wheel brake mechanisms Br of the left and right rear wheels 2 to perform brake operation. Further, the mechanical brake operating system is configured in a manner that, when the parking lever 15 is operated, an operating force of an operation wire 64 as a brake operating member is transmitted to the equalizer H, and an operating force from the equalizer H is transmitted to the rear wheel brake mechanisms Br of the left and right rear wheels 2 to perform brake operation.

Figure 7:
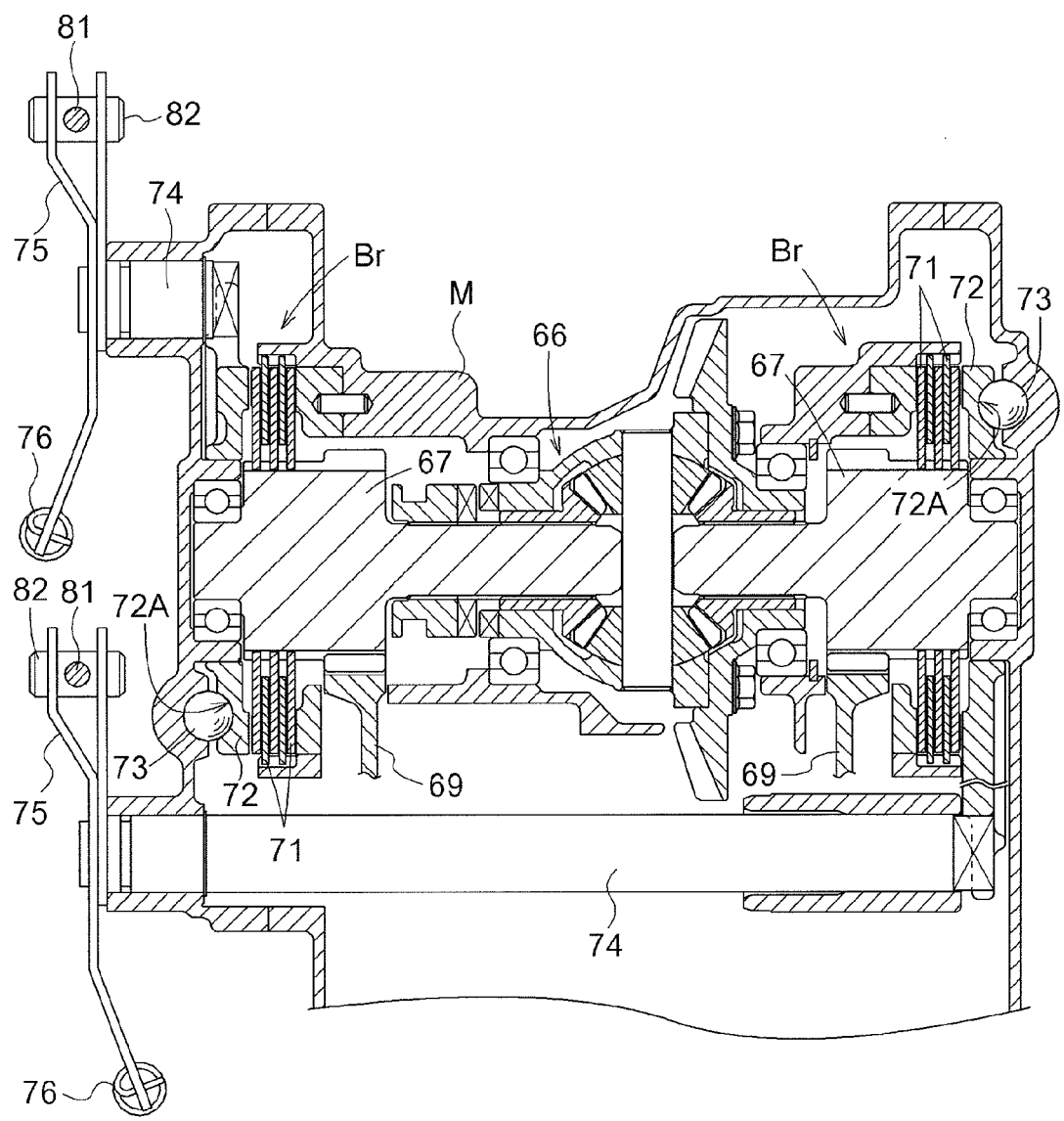
FIG. 7 is a sectional view of a transmission case illustrating a configuration of a brake mechanism.
Figure 8:
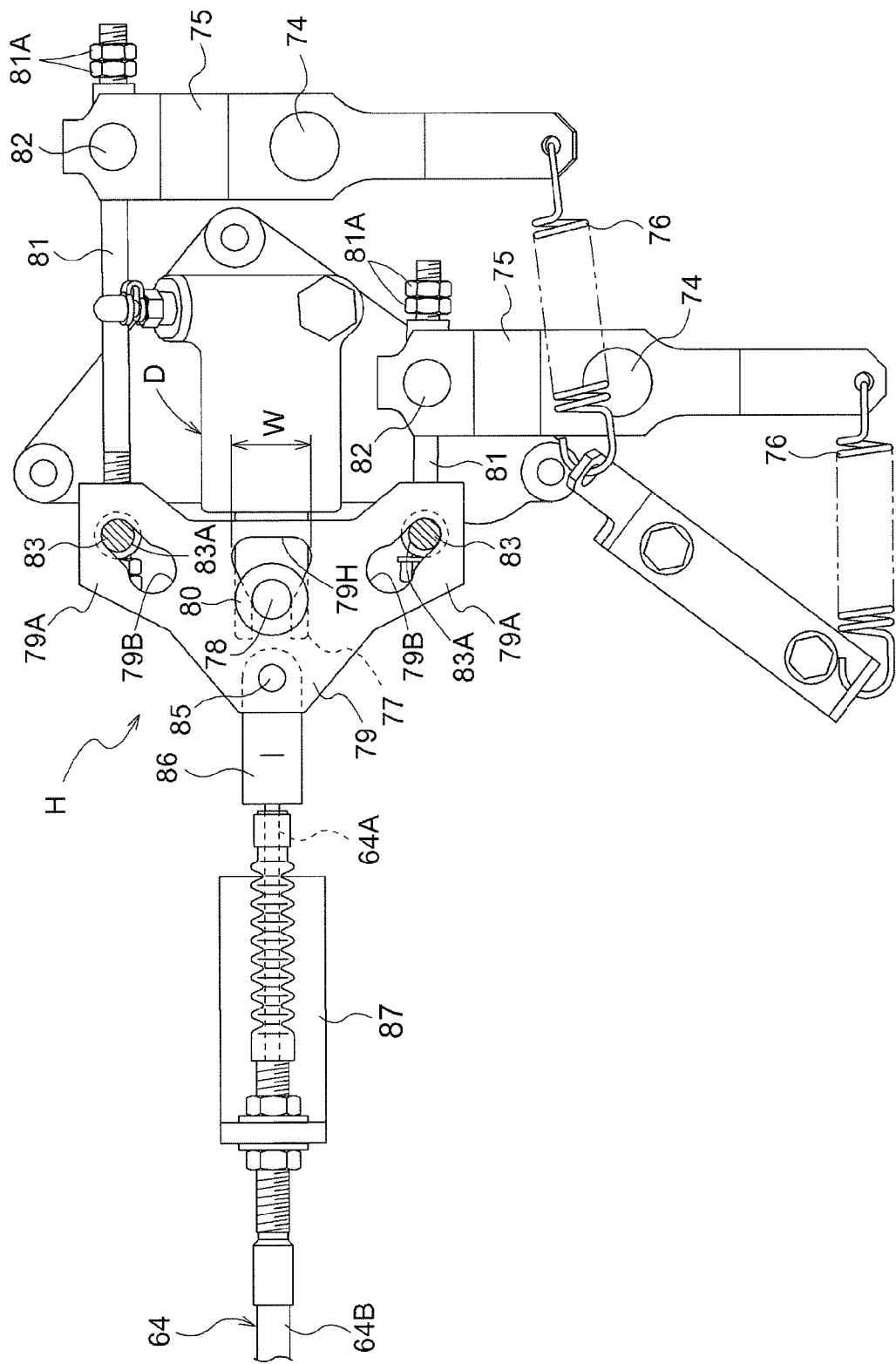
FIG. 8 is a side view illustrating a configuration of an equalizer.
Figure 9:
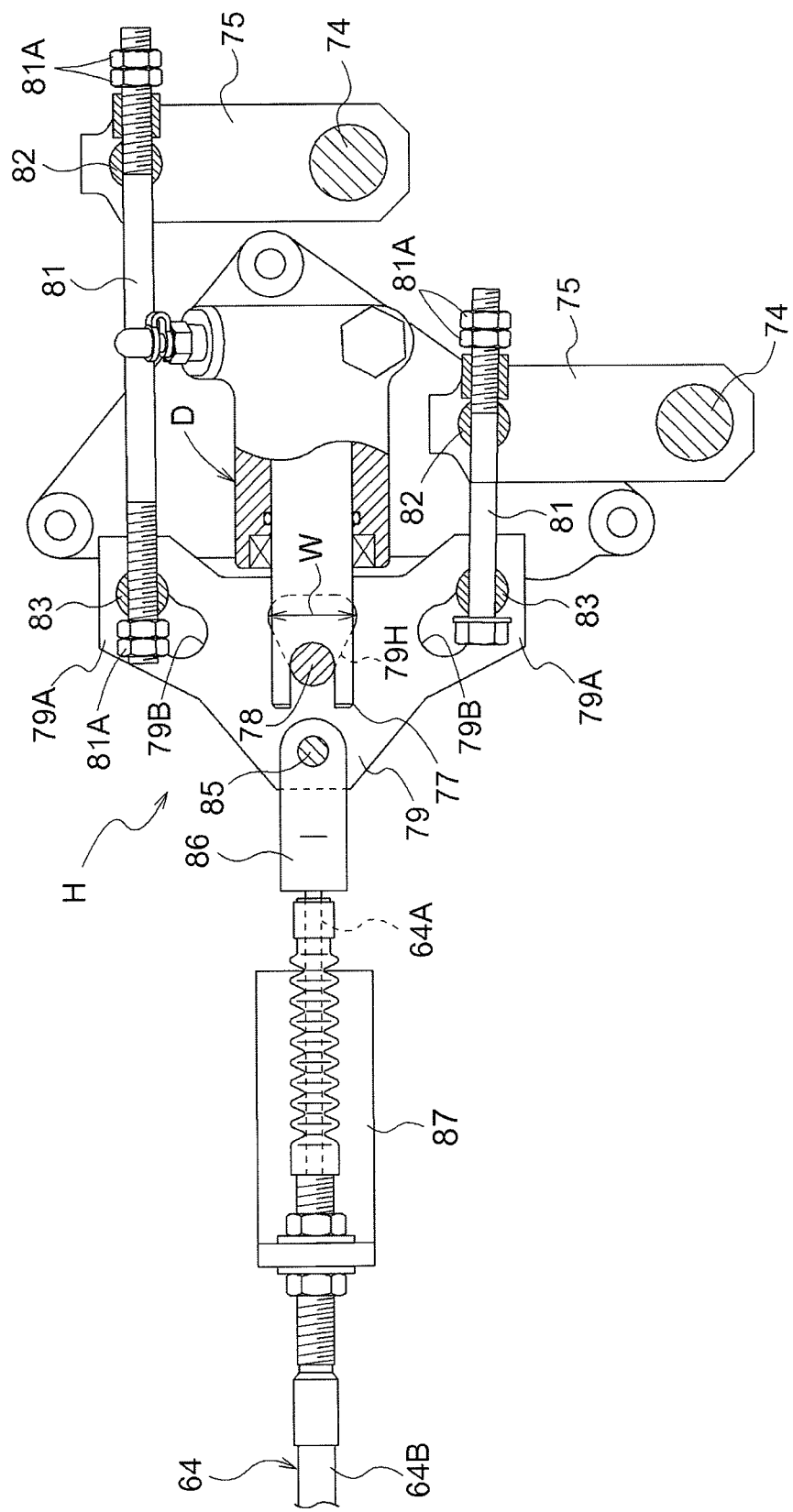
FIG. 9 is a sectional view illustrating the configuration of the equalizer.
Figure 10:
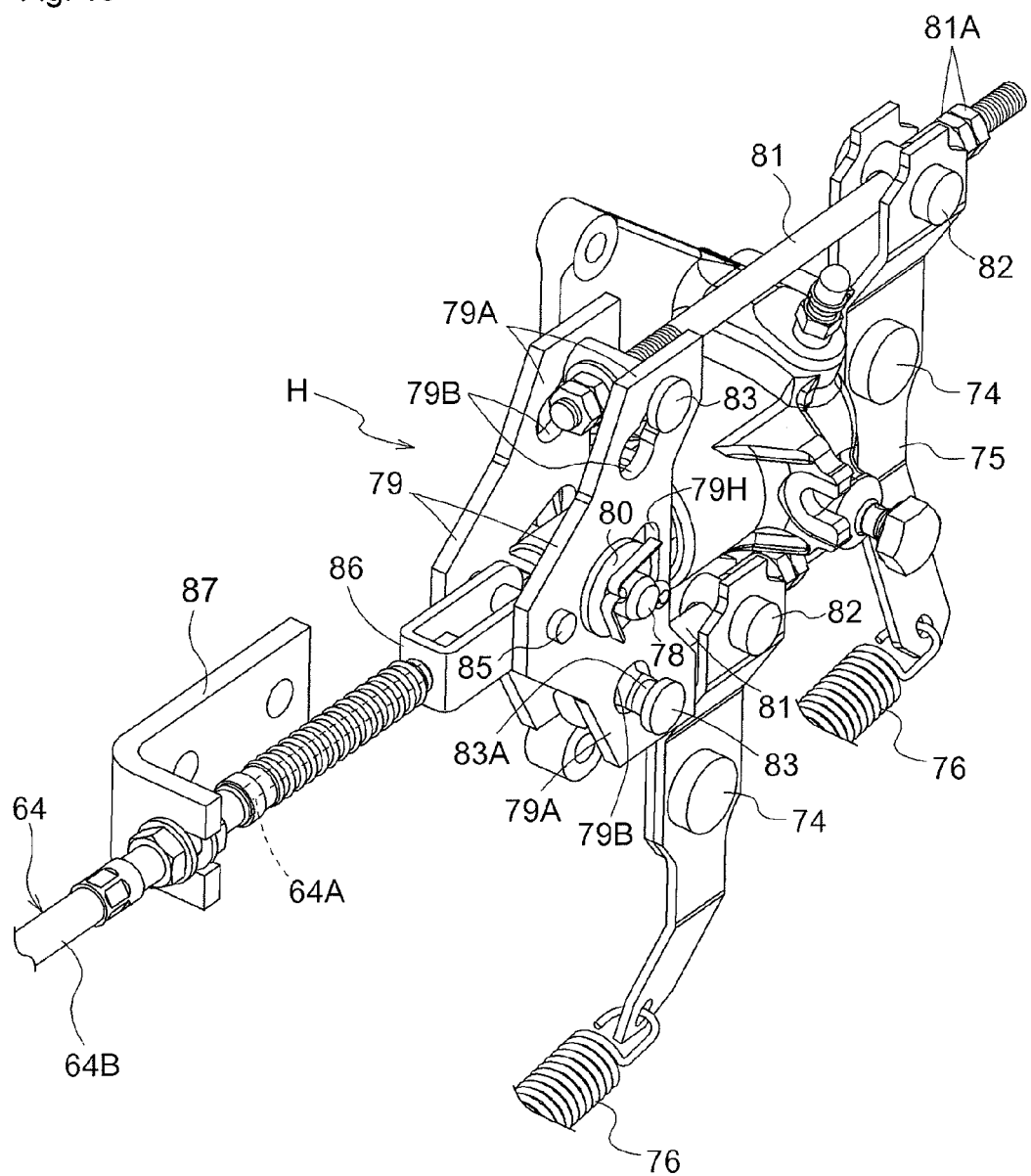
FIG. 10 is a perspective view illustrating the configuration of the equalizer.

As FIGS. 6 and 7 illustrate, the transmission case M has built-in a gear-type transmission (not illustrated in the drawings) and a differential gear 66, the transmission speed-changing a driving force speed-changed by the continuously variable transmission V into a plurality of speeds and performing forward and backward switching, and a driving force from the transmission being transmitted to the differential gear 66. Further, in the transmission case M, left and right side shafts 67 are provided transmitting the driving force from the differential gear 66; gear interlocking mechanisms 69 are provided transmitting driving forces from the side shafts 67 to left and right rear wheel drive shafts 68; and the multi-plate friction type rear wheel brake mechanisms Br are built-in applying braking forces to the left and right side shafts 67.

The rear wheel brake mechanisms Br are provided with a plurality of friction plates 71; crimping plates 72 applying a crimping force to the plurality of friction plates 71; and a cam mechanism shifting the crimping plates 72 along an axis of the side shafts 67 along with the rotation of the crimping plates 72. The cam mechanism is configured to include cam grooves 72A formed on the crimping plates 72; and balls 73 engaging the cam grooves 72A. The cam grooves 72A are formed in a circular-arc-shaped area around the axes of the side shafts 67 in a form having different depth in a circumferential direction. The friction plates 71 are configured to alternately arrange parts that integrally rotate with the side shafts 67 and parts that are non-rotatably supported on the transmission case M.

From such a configuration, by rotating the crimping plates 72 in a braking direction about the axes of the side shafts 67, the crimping plates 72 are shifted and the plurality of friction plates 71 are crimped. As a result, the rear wheel brake mechanisms Br reach a braking state. Further, by rotating the crimping plates 72 in a reversed direction, the crimping plates 72 are shifted in a reversed direction, and the crimping of the plurality of friction plates 71 is released. Therefore, the braking of the rear wheel brake mechanisms Br is released.

The cam mechanism shifting the crimping plates 72 may also be configured without using the balls 73 in such a manner that, for example, a convex portion is formed on either the crimping plates 72 or an inner wall surface of the transmission case M and a convex portion is also formed on another surface opposing the former convex portion; and the crimping plates 72 are shifted via contact between the convex portions when the crimping plates 72 rotate. Further, the cam grooves 72A may also be formed on an inner surface of the transmission case M.

As FIGS. 7-10 illustrate, in the transmission case M, two brake operating shafts 74 corresponding to the left and right rear wheel brake mechanisms Br are rotatably supported in a form parallel to the side shafts 67. The brake operating shafts 74 are configured in a manner that engagement portions formed by notching inner ends of the brake operating shafts 74 are engaged with engagement portions formed on outer peripheries of the crimping plates 72, and the crimping plates 72 are rotated in conjunction with the rotation of the brake operating shafts 74. Further, outer ends of the brake operating shafts 74 are exposed to the outside from an outer wall on the left side of the transmission case M. Brake operating arms 75 are fixedly provided on the exposed end portions. Return springs 76 are provided on the brake operating arms 75, applying a biasing force rotating the brake operating arms 75 in a brake-releasing direction. According to this configuration, when the brake operating shafts 74 are rotated in the braking direction, the crimping plates 72 are rotated and the rear wheel brake mechanisms Br reach the braking state; and when the rotation of the brake operating shafts 74 is released, the brake operating shafts 74 are rotated in the brake-releasing direction by the biasing force of the return springs 76, and the braking forces of the rear wheel brake mechanisms Br are released.

The cylinder unit D is provided at the outside of the outer wall on the left side of the transmission case M, having a brake piston 77 fitted therein in a manner withdrawable in a direction parallel to the outer wall. An engagement shaft 78 in a lateral orientation perpendicular to the axis of the brake piston 77 is provided at a projecting end of the brake piston 77 in a form of being fitted between front ends of the brake piston 77. Two plate-like balance members 79 are arranged at positions sandwiching the brake piston 77, in an orientation parallel to the outer wall on the left side of the transmission case M. An engagement shaft 78 is inserted through an engagement hole portion 79H (an example of an accommodation portion) formed on the two balance members 79. A retaining washer 80 is provided on a shaft end of the engagement shaft 78. The engagement shaft 78 and the engagement hole portion 79H constitute a traction device.

The two balance members 79 each have a shape that approximates an isosceles triangle in which a pair of arm portions 79A are formed at positions symmetrical around a position where the engagement hole portion 79H is formed as a center position, and a projecting portion is formed by projecting the center position in the projecting direction (leftward direction in FIGS. 8 and 9) of the brake piston 77. The engagement hole portion 79H as the accommodation portion is formed in an isosceles triangular shape with the projecting direction of the brake piston 77 as a vertex. A broad area W is formed having a width that becomes increasingly broad toward an upstream side of the projecting actuation of the brake piston 77 (on the side opposite to the projecting operation). This broad area W allows relative movement between the brake piston 77 and the balance members 79 in a direction perpendicular to the projecting direction of the brake piston 77.

Brake operating rods 81 formed from bolts are provided between end portions of the pair of arm portions 79A and the above-described pair of brake operating arms 75. As a specific configuration, keyhole-shaped hole portions 79B are formed on the arm portions 79A of the balance members 79, having a smaller diameter on the outer end sides of the balance members 79 (outer end sides of the arm portions 79A) and a larger diameter on the center sides. Support shafts 82 are provided at operating ends of the brake operating arms 75 in a manner rotatable about axes parallel to the axes of the brake operating shafts 74. Through holes are formed on the support shafts 82, through which the brake operating rods 81 are inserted.

Engagement-and-disengagement shafts 83 are configured to have an outer diameter that can be inserted through the large-diameter portions of the keyhole-shaped hole portions 79B and have annular grooves 83A that engage the small-diameter portions of the keyhole-shaped hole portions 79B. Through holes through which the brake operating rods 81 are inserted are formed on the engagement-and-disengagement shafts 83. From such a configuration, the engagement-and-disengagement shafts 83 are inserted from the large-diameter portions of the keyhole-shaped hole portions 79B; the annular grooves 83A are engaged with the small-diameter portions of the keyhole-shaped hole portions 79B; the brake operating rods 81 are inserted through the through holes of the engagement-and-disengagement shafts 83 and the through holes of the support shafts 82; and nuts 81A are screwed to threaded portions of end portions of the brake operating rods 81. Thereby, an operating system is configured transmitting a force from the balance members 79 to the brake operating arms 75.

A bracket 86 is swingably connected to the projecting portion of the two balance members 79 by a coupling pin 85 in an orientation parallel to the engagement shaft 78, in a manner swingable about the axis of the coupling pin 85. An operation wire 64 as a brake operating member is configured with an inner wire 64A and an outer wire 64B. An end portion of the inner wire 64A is connected to the bracket 86. An end portion of the outer wire 64B is supported on the outside of the transmission case M by a support member 87.

A brake operating device is configured with the brake piston 77 and the operation wire 64. The above-described equalizer H is configured by an operating system that is provided with the balance members 79 transmitting operating forces to the left and right rear wheel brake mechanisms Br by an operating force from the brake piston 77 or the operation wire 64 as the brake operating device. Further, when a brake operating force is applied from the brake operating device, the equalizer H absorbs a difference in operating strokes of the left and right rear wheel brake mechanisms Br and uniformly brake-operates the left and right rear wheel brake mechanisms Br.

(Actuation Mode of Rear Wheel Brake Mechanisms)

From such a configuration, when the brake pedal 17 is depressed, the brake oil pressurized by the master cylinder 61 is supplied from the rear brake oil passage 63 to the cylinder unit D, and the brake piston 77 is actuated in the projecting direction. The projecting actuation is transmitted by the engagement shaft 78 as the traction device to the inner wall surface of the engagement hole portion 79H of the balance members 79, and the balance members 79 are actuated in the projecting direction. This actuation force is transmitted as an operating force pulling the pair of brake operating rods 81 from the pair of arm portions 79A of the balance members 79; the pair of brake operating arms 75 are operated; and the pair of brake operating shafts 74 are simultaneously rotated in the braking direction. Thereby, the left and right plurality of friction plates 71 are crimped and braking of the left and right rear wheel brake mechanisms Br is realized.

In a case where swing amounts of the brake operating arms 75 until the left and right rear wheel brake mechanisms Br reach a braking state are different (there is a difference in operating strokes), during the projecting actuation of the brake piston 77, for the pairs of arm portions 79A of the balance members 79, displacement of the one arm portion 79A corresponding to the brake operating arm 75 that first reached the braking state is inhibited, and in such a state, displacement of the other arm portion 79A is performed. That is, in a state in which the engagement shaft 78 is in contact with the inner peripheral surface of the engagement hole portion 79H, the balance members 79 swing about the contact site, absorb the operating stroke difference of the pair of brake operating arms 75, and use uniform braking force on the rear wheel brake mechanisms Br.

Further, when the parking lever 15 as the parking brake operating tool is operated, a pulling force from the operation wire 64 as the brake operating member is transmitted from the bracket 86 to the balance members 79, and the balance members 79 are pulled. The direction of this pulling operation is the same direction as the projecting direction of the brake piston 77. In the case where the swing amounts of the brake operating arms 75 until the left and right rear wheel brake mechanisms Br reach a braking state are different (there is a difference in operating strokes), the balance members 79 swing about the coupling pin 85, and thereby uniformly apply actuation forces to the pair of brake operating arms 75.

In particular, for example, when the above-described engagement hole portion 79H has a diameter that is the same as the outer diameter of the engagement shaft 78, although the balance members 79 cannot swing, since as described above the engagement hole portion 79H is formed in an isosceles triangular shape, in the broad area W of the engagement hole portion 79H, relative displacement between the engagement shaft 78 and the balance members 79 becomes possible, and swing of the balance members 79 with respect to the brake piston 77 is realized.

(Hydraulic System)

Figure 11:
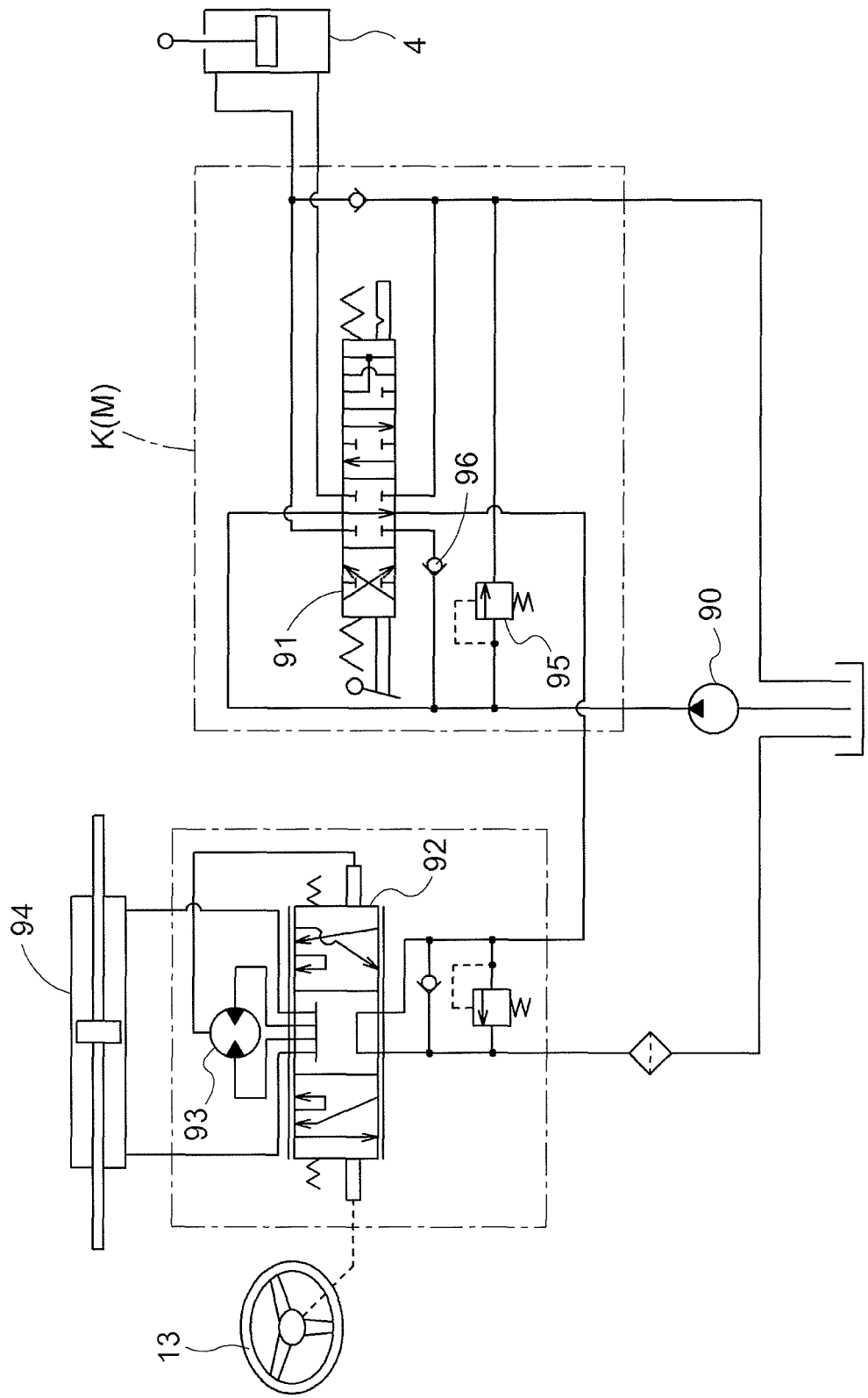
FIG. 11 is a hydraulic circuit diagram illustrating a lift control system and a steering control system.

As FIG. 11 illustrates, in this working vehicle, a hydraulic circuit is configured in which a lift control system and a steering control system are provided. The lift control system has a lift control valve 91 that supplies and discharges hydraulic oil from a work hydraulic pump 90 to a dump cylinder 4. The steering control system operates a steering cylinder 94, in conjunction with the operation of the steering wheel 13, to realize steering of the front wheels 1 by supplying hydraulic oil from the lift control valve 91 in a neutral position to a steering valve 92, and from the steering valve 92 to a metering pump 93 and a steering cylinder 94.

A main relief valve 95 and a main check valve 96 are provided on a path branched from the oil passage supplying the hydraulic oil from the work hydraulic pump 90 to the lift control valve 91, and a lift control valve unit K is configured incorporating these parts into a single block. This lift control valve unit K is provided inside the transmission case M on the right side.

In this hydraulic circuit, lubricant oil of the transmission case M is used as the hydraulic oil. In the lift control valve unit K, an oil passage supplying the hydraulic oil to a hydraulic block (an oil passage in which pressure is applied) is formed. A spool constituting the lift control valve 91 is inserted into a spool hole formed in this hydraulic block. Similar to this, a configuration is adopted in which valves and springs constituting the main relief valve 95 and the main check valve 96 are set inside the hydraulic block. Compared to a configuration in which an oil passage returning hydraulic oil to a drain is open inside the transmission case M, structural simplification is realized.

The steering valve 92 is operated in conjunction with the operation of the steering wheel 13. By the steering operation, the steering valve 92 is operated, and supplies the hydraulic oil from the work hydraulic pump 90 to the steering cylinder 94. When the hydraulic oil is being supplied, the metering pump 93 is actuated for an amount corresponding to the amount of the hydraulic oil; an actuation returning the steering valve 92 to a neutral position is performed; and, in a state in which a rotational operation amount of the steering wheel 13 is maintained, the front wheels 1 are steered for an angle corresponding to the rotational operation amount.

Figure 12:
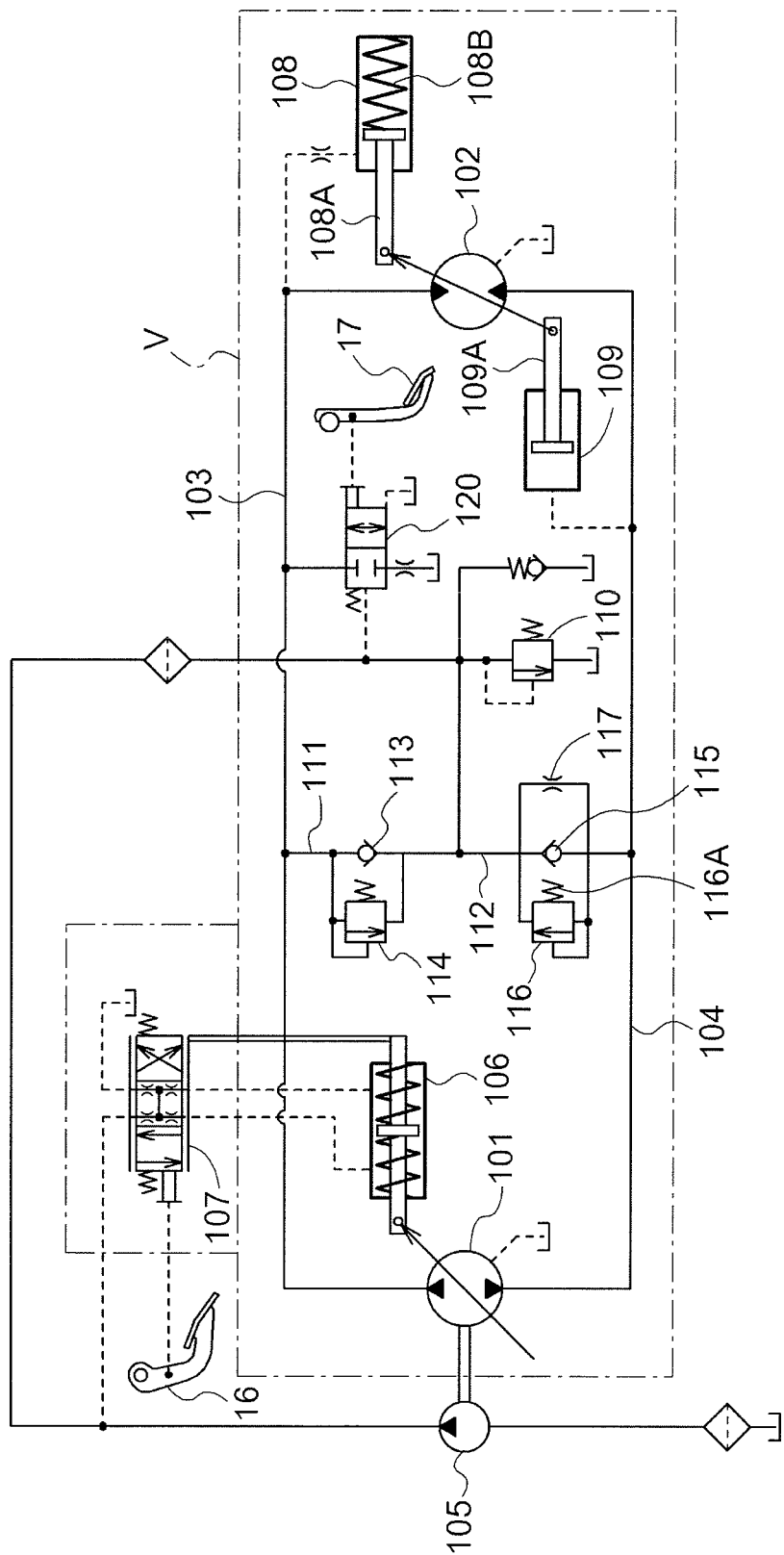
FIG. 12 is a hydraulic circuit diagram of a continuously variable transmission.

As FIG. 12 illustrates, the continuously variable transmission V is provided with: a hydraulic pump 101 configured to be of an axial plunger, variable capacity type that is actuated by a driving force from the engine E; a hydraulic motor 102 configured to be of an axial plunger, variable capacity type that rotates via the hydraulic oil supplied from the hydraulic pump 101; a high pressure side oil passage 103 and a low pressure side oil passage 104 that connect the hydraulic pump 101 and the hydraulic motor 102; a charge pump 105 driven along with the hydraulic pump 101; a servo cylinder 106 setting an angle of a swash plate of the hydraulic pump 101; and a servo control valve 107 controlling the servo cylinder 106.

The servo control valve 107 controls hydraulic oil from the charge pump 105 and is mechanically linked to the accelerator pedal 16. When the accelerator pedal 16 is depressed, the servo control valve 107 actuates the servo cylinder 106 for an angle corresponding to a servo amount, and changes the angle of the swash plate of the hydraulic pump 101 to achieve an increase in the traveling speed.

Further, in order to set the angle of the swash plate of the hydraulic motor 102, a first adjustment cylinder 108 and a second adjustment cylinder 109 are provided. A first piston 108A of the first adjustment cylinder 108 is biased toward the projecting direction by a return spring 108B so as to set the angle of the swash plate to zero degrees. Hydraulic oil from the high pressure side oil passage 103 is supplied to the first adjustment cylinder 108 in a direction to deflate the piston. Further, the second adjustment cylinder 109 is provided with a second piston 109A, which is actuated in the projecting direction by hydraulic oil supplied from the low pressure side oil passage 104.

From such a configuration, as in the case where the accelerator pedal 16 is not depressed, in a state in which the pressure of the high pressure side oil passage 103 is extremely low, the swash plate of the hydraulic motor 102 is maintained at zero degrees by the biasing force of the return spring 108B, and traveling of the traveling vehicle body A is not performed. In contrast, in the case where the accelerator pedal 16 is depressed and the pressure of the high pressure side oil passage 103 is raised, the hydraulic oil from the hydraulic pump 101 is supplied to the hydraulic motor 102 via the high pressure side oil passage 103, and is returned to the hydraulic pump 101 via the low pressure side oil passage 104. In this state, the first piston 108A is actuated to project against the biasing force of the return spring 108B, and a force is applied by the pressure of the hydraulic oil from the low pressure side oil passage 104 so that the second piston 109A maintains a projected state. Thereby, in a state in which the respective forces are balanced, the angle of the swash plate is increased, and thereby traveling is performed.

In the continuously variable transmission V, an unload valve 120 is provided, which, when the brake pedal 17 is depressed, stops the rotation of the hydraulic motor 102 by draining the hydraulic oil from the high pressure side oil passage 103 to a tank port side (drain side).

Further, a charge pressure valve 110 of a relief type is provided determining a supply pressure of the hydraulic oil from the above-described charge pump 105. A first charge oil passage 111 supplying the hydraulic oil from the charge pump 105 to the high pressure side oil passage 103 and a second charge oil passage 112 supplying the hydraulic oil from the charge pump 105 to the low pressure side oil passage 104 are provided. A first check valve 113 is provided in the first charge oil passage 111, and a first relief valve 114 is provided in a parallel oil passage. A second check valve 115 is provided in the second charge oil passage 112; a second relief valve 116 is provided in a parallel oil passage; and, in an oil passage parallel to these, an orifice 117 is provided.

In particular, as in the case where a foot is released from the accelerator pedal 16 during traveling, in a situation where the traveling vehicle body A moves due to inertia, the rotation of the hydraulic motor 102 may cause the pressure of the low pressure side oil passage 104 to reach a value higher than the pressure of the high pressure side oil passage 103. In such a case, in order to allow the pressure of the low pressure side oil passage 104 to escape to the high pressure side oil passage 103 and to smoothly actuate an engine brake, a biasing force of a setting spring 116A setting a relief pressure of the second relief valve 116 is adjustably configured (the configuration is not illustrated in the drawings). That is, in the case where the pressure of the low pressure side oil passage 104 rises above the pressure of the high pressure side oil passage 103, the second relief valve 116 allows the pressure of the low pressure side oil passage 104 to escape to the high pressure side oil passage 103 and, thereby, inhibits a sudden change in speed and satisfactorily actuates the engine brake to perform deceleration.

The configuration for adjusting the biasing force of the setting spring 116A of the second relief valve 116 is assumed to be a configuration in which a knob and the like is manually operated. However, this may also be configured to be changed by an electric motor.

(Operation Effect of the Embodiment)

According to such a configuration, when the brake pedal 17 is depressed, the brake oil pressurized by the master cylinder 61 is supplied from the front brake oil passage 62 to the left and right front wheel brake mechanisms Bf, and the front wheels 1 are brake-operated. At the same time, the brake oil pressurized by the master cylinder 61 is supplied from the rear brake oil passage 63 to the cylinder unit D, the brake piston 77 is actuated to project, and the equalizer H having the balance members 79 operates the left and right brake operating arms 75 to uniformly brake-operate the left and right rear wheel brake mechanisms Br. In particular, the equalizer H is configured with the operating system that is provided with the balance members 79. When the brake piston 77 is actuated to project by the depression operation of the brake pedal 17, the engagement shaft 78 is swingable about the contact site with the inner surface of the engagement hole portion 79H of the balance members 79. Therefore, due to the swing, a difference in the operating strokes of the left and right rear wheel brake mechanisms Br is absorbed, and the left and right rear wheel brake mechanisms Br are uniformly brake-operated.

Further, the engagement shaft 78 is configured to be movable in the broad area W of the engagement hole portion 79H. Therefore, when the parking lever 15 is operated to actuate the bracket 86, the balance members 79 freely swing about a connecting site of the coupling pin 85. Due to the swing of the balance members 79, a difference in the operating strokes of the left and right rear wheel brake mechanisms Br is absorbed, and the left and right rear wheel brake mechanisms Br are uniformly brake-operated. In this configuration, a single cylinder unit D is used to operate the left and right rear wheel brake mechanisms Br. Therefore, as compared to a case where a plurality of cylinders are provided, the hydraulic system is simplified and cost reduction is realized.

Further, the lift control valve unit K is provided inside the transmission case M on the right side. Therefore, assembly of the lift control valve 91, the main relief valve 95, and the main check valve 96 is facilitated, and simplification of an oil passage system returning hydraulic oil to a drain for these parts is realized.

Further, when a foot is released from the accelerator pedal 16 in order to depress the brake pedal 17, the second relief valve 116 of the continuously variable transmission V enters a relief state; the hydraulic oil of the low pressure side oil passage 104 flows to the high pressure side oil passage 103; and a smooth deceleration is realized in an engine brake state. In particular, when the brake pedal 17 is depressed, the unload valve 120 of the continuously variable transmission V is operated, and the hydraulic oil of the high pressure side oil passage 103 is drained to the tank side (drain side). Thereby, the hydraulic motor 102 of the continuously variable transmission V is stopped, and the traveling vehicle body A is quickly brought to a stop.

OTHER EMBODIMENTS

In addition to the above-described embodiment, the present invention may also be configured as follows.

Figure 13:
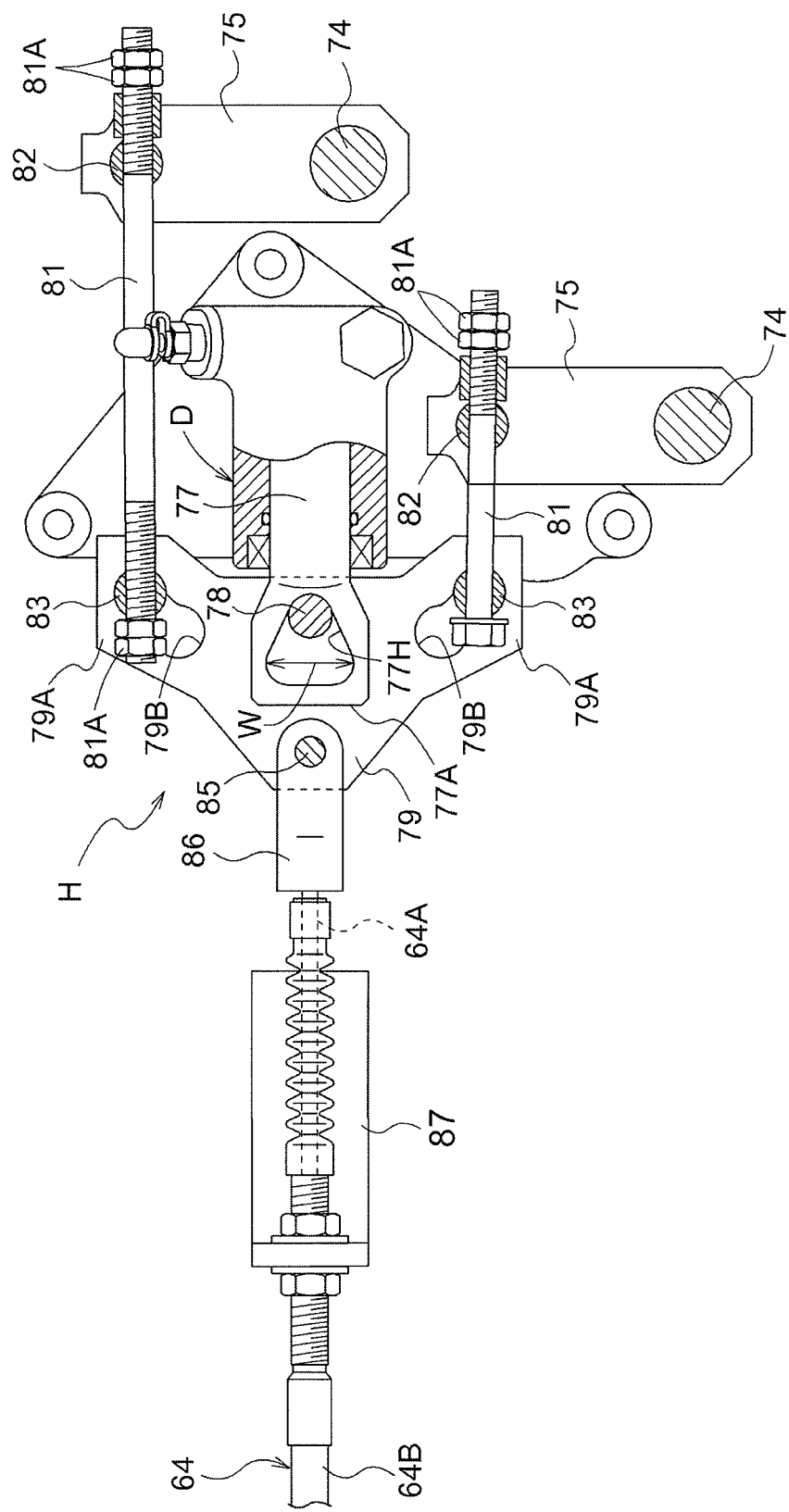
FIG. 13 is a sectional view illustrating a configuration of an equalizer according to an other embodiment (a).

(a) As FIG. 13 illustrates, a plate-like support portion 77A is integrally formed at an end portion on the projecting side of the brake piston 77. On the support portion 77A, an engagement hole portion 77H is formed in an isosceles triangular shape that becomes increasingly broad toward a downstream side of the projecting actuation of the brake piston 77. Further, the engagement shaft 78 penetrating the balance members 79 is inserted through the engagement hole portion 77H in an orientation perpendicular to the axis of the brake piston 77. Thereby, a traction device is configured. The inner wire 64A of the operation wire 64 as the brake operating member is connected to the balance members 79 by the coupling pin 85.

In this configuration, a broad area W is configured in the engagement hole portion 77H. When the brake piston 77 is actuated to project, swing of the balance members 79 about the contact site of the engagement shaft 78 is realized, and, when the operation wire 64 is pulled, swing of the balance members 79 about the coupling pin 85 is realized.

(b) An equalizer H is provided in the brake operating system transmitting an operating force from the brake operating device to the front wheel brake mechanisms Bf of the front wheels 1. Further, both the front wheel brake mechanisms Bf of the front wheels 1 and the rear wheel brake mechanisms Br of the rear wheels 2 are configured in a brake system of the working vehicle. By configuring the brake system this way, the configuration of the brake operating system is simplified and reduction in the number of parts is realized.

(c) The equalizer H having the balance members 79 is provided at a site other than a lateral side of the transmission case M, such as above or below the transmission case M. According to this configuration, a dead space outside the transmission case M can be effectively utilized to configure the brake system.

(d) A single member is used instead of two members as the balance members 79 constituting the equalizer H. As described above, by using the single member, reduction in the number of parts is realized.

INDUSTRIAL APPLICABILITY

The present invention is applicable to a working vehicle provided with an equalizer for operating brake mechanisms.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A working vehicle comprising:
a brake operating system transmitting a brake operating force of a brake operating device from an equalizer to brake mechanisms of left and right wheels, the equalizer having a pair of arm portions transmitting the brake operating force to the left and right brake mechanisms; and
a swingable balance member absorbing a difference between operating strokes of the left and right brake mechanisms,
the brake operating device comprising:
a single brake piston being actuated in a projecting direction by pressure of brake oil supplied by a depression operation of a brake pedal; and
a brake operating member transmitting an operating force of a parking brake operating tool,
wherein
the brake operating member is connected to and applies a pulling force from one side of the balance member,
the brake piston is structured and arranged to transmit an actuating pushing force in the projecting direction to the balance member, said pushing force being exerted from an opposite side of the balance member, and
movement of the brake operating member during application of the pulling force allowing relative linear movement between the brake piston and the balance member.

2. The working vehicle according to claim 1, further comprising a traction device comprising:
an engagement shaft arranged in an orientation perpendicular to an axis of the brake piston; and
an engagement hole portion through which the engagement shaft is inserted,
wherein
the actuation force of the brake piston in the projecting direction is transmitted to the balance member via contact between the engagement shaft and an inner periphery of the engagement hole portion, and
the engagement hole portion is sized to allow relative movement between the engagement shaft and the engagement hole portion in a direction perpendicular to an actuation direction of the brake piston.

3. The working vehicle according to claim 2, wherein
the engagement shaft is formed at a front end portion of the brake piston,
the engagement hole portion is formed on the balance member,
the engagement hole portion has a triangular shape as viewed in a direction along the axis of the engagement shaft, in which width increases toward an upstream side of the projecting actuation of the brake piston, and
the broad area is formed by a portion of the engagement hole portion with a wide width.

4. The working vehicle according to claim 1, wherein
the left and right brake mechanisms are built-in to a transmission case transmitting a driving force to left and right wheels,
brake operating shafts operating the left and right brake mechanisms are provided in parallel orientation protruding on a predetermined outer wall of the transmission case, and
the balance member is arranged outside of the outer wall in an orientation parallel to the outer wall.

5. The working vehicle according to claim 1, wherein:
the single brake piston comprises a projecting end having an engagement notch adapted to receive therein an engagement shaft.

6. The working vehicle according to claim 1, wherein:
the single brake piston comprises a projecting end having an engagement hole adapted to receive therein an engagement shaft and the balance member comprises two holes arranged on opposite sides of the engagement shaft.

7. A working vehicle comprising a brake operating system configured to transmit a brake operating force in an equalized manner to brake mechanisms of left and right wheels, wherein the brake operating system comprises:
a swingable balance member absorbing a difference between operating strokes of the left and right brake mechanisms;
a first brake operating device capable of applying brake operating force equally to brake mechanisms of left and right wheels via the swingable balance member and comprising a brake piston that is movable by pressure of brake oil supplied upon operation of a brake pedal; and
a second brake operating device capable of applying brake operating force equally to brake mechanisms of left and right wheels via the swingable balance member and comprising a brake operating member that is movable upon operation of a parking brake operating tool, wherein the brake operating member is connected to the swingable balance member, and wherein the brake operating member and the brake piston are arranged on opposite sides of the balance member so as respectively apply pulling and pushing forces along a direction of a center axis of the brake piston.

8. The working vehicle according to claim 7, wherein:

the first brake operating device is coupled to the swingable balance member so as to allow relative linear movement between the brake piston and the swingable balance member; and the second brake operating device is coupled to the swingable balance member via a coupling pin and the brake operating member is a wire.

9. The working vehicle according to claim 7, wherein:

the first brake operating device is arranged on one side of the swingable balance member;

the second brake operating device is coupled to the swingable balance member via a coupling pin and is arranged on an opposite side of the swingable balance member; and the swingable balance member comprises first and second connecting portions spaced apart from each other and respectively coupled to brake operating rods.

10. The working vehicle according to claim 7, wherein the brake operating system has the following modes of operation;

a first mode wherein the first brake operating applies brake operating force equally to brake mechanisms of left and right wheels via the swingable balance member when the brake piston is caused to move by pressure of brake oil supplied upon operation of a brake pedal; and a second mode wherein the second brake operating device applies brake operating force equally to brake mechanisms of left and right wheels via the swingable balance member when the brake operating member is caused to move upon operation of a parking brake operating tool.

11. The working vehicle according to claim 10, wherein during the first mode, the applied brake operating force exerts a pushing force on the swingable balance member.

12. The working vehicle according to claim 10, wherein during the second mode, the applied brake operating force exerts a pulling force on the swingable balance member.

13. The working vehicle according to claim 10, wherein the swingable balance member moves in a same direction in both the first and second modes.

14. The working vehicle according to claim 10, wherein the swingable balance member is capable of being initially moved in the second mode without causing the brake piston to move along a same direction.

15. A working vehicle comprising a brake operating system configured to transmit a brake operating force in an equalized manner to brake mechanisms of left and right wheels, wherein the brake operating system comprises:

a swingable balance member absorbing a difference between operating strokes of the left and right brake mechanisms;

a first brake operating device capable of applying brake operating force to brake mechanisms of left and right wheels via the swingable balance member and comprising:

a brake piston that is movable by pressure of brake oil supplied upon operation of a brake pedal; and a projecting end of the brake piston having an engagement notch adapted to receive therein an engagement shaft coupled to the swingable balance member;

a second brake operating device capable of applying brake operating force to brake mechanisms of left and right wheels via the swingable balance member and comprising a brake operating member that is movable upon operation of a parking brake operating tool, wherein the brake operating member is connected to the swingable balance member, and wherein the brake operating member and the brake piston are arranged on opposite sides of the balance member so as respectively apply pulling and pushing forces along a direction of a center axis of the brake piston.

16. The working vehicle according to claim 15, wherein during a first mode of operation, the applied brake operating force exerts a pushing force on the swingable balance member and the balance member moves away from a cylinder unit of the brake piston.

17. The working vehicle according to claim 16, wherein during a second mode of operation, the applied brake operating force exerts a pulling force on the swingable balance member and the balance member moves relative to the brake piston.

18. The working vehicle according to claim 17, wherein the swingable balance member moves in a same direction in both the first and second modes.

19. The working vehicle according to claim 17, wherein the swingable balance member is capable of being initially moved in the second mode without causing the brake piston to move along a same direction.

20. The working vehicle according to claim 15, wherein the swingable balance member comprises a plate member and is arranged between the brake piston and the brake operating member.

* * * * *